(12) United States Patent
Tiberghien et al.

(10) Patent No.: US 9,528,650 B2
(45) Date of Patent: Dec. 27, 2016

(54) FEMALE QUICK-CONNECT COUPLING ELEMENT, AND A QUICK-CONNECT COUPLING INCORPORATING SUCH AN ELEMENT

(71) Applicant: STAUBLI FAVERGES, Faverges (FR)

(72) Inventors: Alain-Christophe Tiberghien, Sevrier (FR); Antoine Chambaud, Giez (FR)

(73) Assignee: STAUBLI FAVERGES, Faverges (FR)

( * ) Notice: Subject to any disclaimer, the term of this patent is extended or adjusted under 35 U.S.C. 154(b) by 136 days.

(21) Appl. No.: 14/198,871

(22) Filed: Mar. 6, 2014

(65) Prior Publication Data
US 2014/0264118 A1   Sep. 18, 2014

(30) Foreign Application Priority Data

Mar. 12, 2013   (FR) ..................... 13 52202

(51) Int. Cl.
| | |
|---|---|
| *F16L 37/138* | (2006.01) |
| *F16L 37/14* | (2006.01) |
| *F16L 37/084* | (2006.01) |
| *F16L 37/086* | (2006.01) |
| *F16K 51/00* | (2006.01) |
| *F16K 21/04* | (2006.01) |
| *F16K 31/12* | (2006.01) |
| *F16K 1/22* | (2006.01) |
| *F16K 31/44* | (2006.01) |
| *F16K 15/00* | (2006.01) |

(Continued)

(52) U.S. Cl.
CPC .............. *F16L 37/46* (2013.01); *F16L 37/086* (2013.01); *F16L 37/0841* (2013.01); *F16L 37/138* (2013.01); *F16L 37/14* (2013.01); *F16L 37/23* (2013.01); *F16L 37/42* (2013.01); *Y10T 137/7854* (2015.04); *Y10T 137/7856* (2015.04)

(58) Field of Classification Search
CPC ........ F16L 17/08; F16L 17/086; F16L 17/084; F16L 17/0841; F16L 17/0842; F16L 37/08; F16L 37/086; F16L 37/084; F16L 37/0841; F16L 37/0842; F16L 37/14; F16L 37/138; F16L 37/42; F16J 13/24; Y10T 137/7854; Y10T 137/7856
USPC ..................... 137/515, 515.5, 613, 614,137/614.02–614.06; 251/142, 149, 251/149.1–149.9, 148, 146; 285/102, 29, 306, 285/82, 83
See application file for complete search history.

(56) References Cited

U.S. PATENT DOCUMENTS

| | | | | |
|---|---|---|---|---|
| 4,667,986 A | * | 5/1987 | Johnson | ................ E21B 33/038 285/24 |
| 7,887,102 B2 | * | 2/2011 | Tiberghien | .......... F16L 37/0841 285/1 |

(Continued)

*Primary Examiner* — Mary McManmon
*Assistant Examiner* — Hailey K Do
(74) *Attorney, Agent, or Firm* — Dowell & Dowell, PC

(57) ABSTRACT

This female quick-coupling element for a quick-connect coupling is able to cooperate with a male coupling element. A control ring is able to move in translation along a longitudinal axis between a first position and a second position. A blocking member prevents translation of the control ring as far as its second position. An element for the elastic return of a piston, integral in transverse movement with the blocking member, to its internal position is mounted in a housing of the first coupling element situated outside the housing of the piston, and fluidically isolated from the fluid-flow conduit. The first coupling element comprises transmission means, disposed between the return element and the piston, to return the piston to its internal position.

14 Claims, 7 Drawing Sheets

(51) Int. Cl.
*F16K 17/00* (2006.01)
*F16L 37/46* (2006.01)
*F16L 37/23* (2006.01)
*F16L 37/42* (2006.01)

(56) References Cited

U.S. PATENT DOCUMENTS

| | | | |
|---|---|---|---|
| 2004/0094739 A1* | 5/2004 | Lacroix | F16L 37/23 251/149.1 |
| 2007/0209718 A1* | 9/2007 | Hansen | F16L 37/23 137/614 |
| 2007/0246108 A1* | 10/2007 | Conway | F16L 37/34 137/614.06 |
| 2009/0243286 A1 | 10/2009 | Horst et al. | |
| 2013/0174928 A1 | 7/2013 | Danielson | |

\* cited by examiner

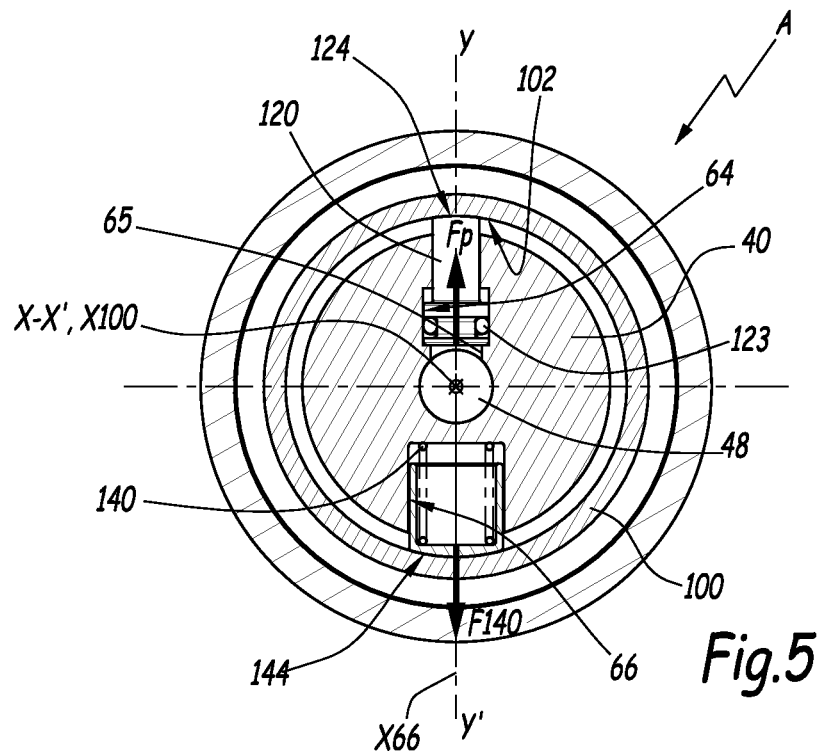
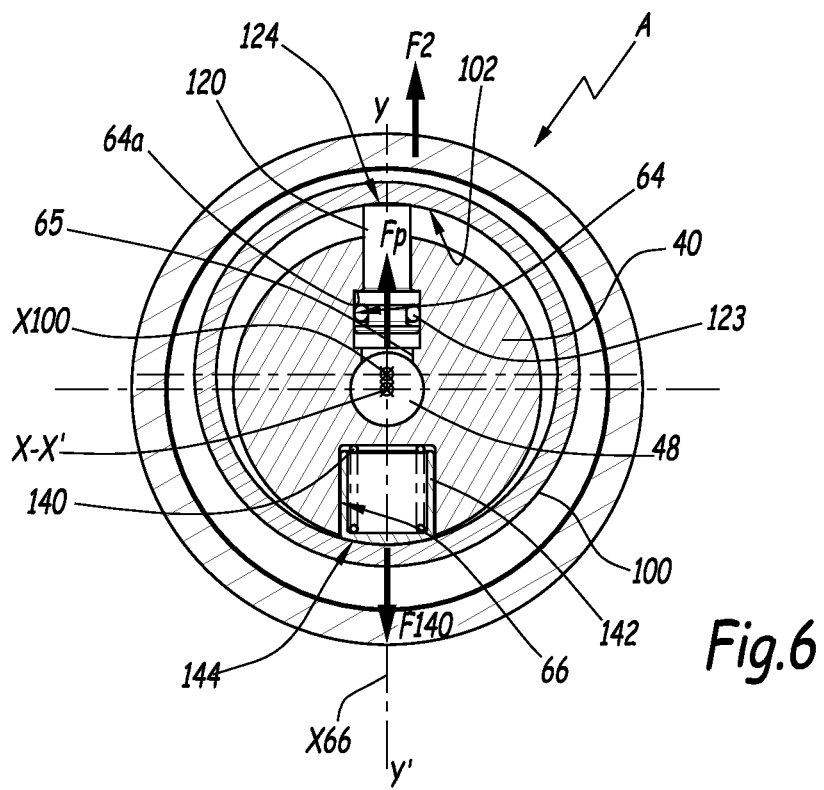

FEMALE QUICK-CONNECT COUPLING ELEMENT, AND A QUICK-CONNECT COUPLING INCORPORATING SUCH AN ELEMENT

BACKGROUND OF THE INVENTION

Field of the Invention

The invention concerns a female quick-connect coupling element for joining two pressurised-fluid pipes. The invention also concerns a quick-connect coupling comprising such a female element.

In the field of high-pressure fluid couplings, in particular suitable for the transfer of hydrogen, for which the pressure of the fluid may be around 800 bar, protecting the coupling by preventing the disconnection of a male element and female element when the pressure of the fluid is too high is known. This is because the whiplash that may occur when the pressure is high, at the time of disconnection, is hazardous to the operator manipulating the coupling.

To do this, the use is known, in particular from EP-A-1 745 237, of a piston moved radially by the pressure of the fluid flowing in the coupling to a locking position, in which a locking ring is locked in the locked position. When the locking ring is in position before locking and the male element is locked in the coupled position in the female element, for example by means of locking balls, release of the coupling is impossible since a rod of the piston projecting out of the body of the female element prevents movement of the locking ring to its release position. When the pressure of the fluid flowing in the coupling drops below a predetermined pressure level, a spring mounted in the same housing as the piston retracts the piston so that the locking means can once again be moved into the release position and the coupling can be decoupled without danger to the operator.

Similar devices, in which a spring is housed in the same housing as the piston, are also known from US-A-2009/243286 and US-A-2013/174928.

Brief Description of the Related Art

This type of construction has several drawbacks. Because of the small space available for the spring in the piston housing, it is difficult to guarantee a substantially constant return force over the compression travel of the spring. This drawback proves to be a problem when the locking and release pressures must be equivalent. Furthermore, when the piston locks the locking ring, if the operator seeks to actuate the locking ring, the piston is acted on under flexion, which may cause a leakage at the piston seal because of its short length.

BRIEF SUMMARY OF THE INVENTION

It is these drawbacks that the invention sets out to remedy by proposing a novel female quick-connect coupling element wherein the system for locking the locking ring guarantees improved functioning.

To this end, the invention concerns a female quick-connect coupling element, for joining two pressurised-fluid pipes, this female coupling element being able to cooperate, along a longitudinal axis of the female element, with a complementary male coupling element, the female coupling element comprising a body through which a fluid-flow conduit passes, at least one locking member able to move between a position of locking the male element with respect to the body of the female coupling element in a coupled configuration of the coupling, and a release position, in which the female and male coupling elements can be uncoupled, a control ring able to move in translation along the longitudinal axis between a first position in which each locking member is held in its locking position, and a second position in which each locking member is able to move into its release position, a piston comprising an active surface in fluid contact with said conduit and being able to move sealingly in a housing passing through the body in a transverse direction from the fluid-flow conduit towards the outside of the body, the piston extending from the active surface opposite to the fluid-flow conduit, a blocking member the movement of which parallel to the transverse direction is integral with the movement of the piston, the piston being able to move from an internal position in which the blocking member does not block the movement of the control ring, to an external position in which the blocking member prevents the translation of the control ring to its second position, and at least one element for the elastic return of the piston to its internal position.

This female coupling element is characterised in that the elastic return element is mounted in a housing of the body of the female coupling element situated outside the housing of the piston, the housing of the elastic return element being fluidically isolated from the fluid-flow conduit, and in that the female coupling element comprises transmission means, disposed between the return element and the piston, for returning the piston to its internal position.

By virtue of the invention, as the return element is not housed in the piston housing, it can benefit from greater travel, which affords better control of the piston return forces.

According to advantageous but non-obligatory aspects of the invention, such a female quick-connect coupling element can incorporate one or more of the following features, taken in any technically permissible combination:

- The housing of the elastic return element is provided in the body opposite to the piston housing with respect to the longitudinal axis.
- The blocking member comprises a lateral surface suitable for receiving, in surface abutment, along the longitudinal axis of the female coupling element, an axial surface of the control ring.
- Said transmission means are mounted outside the body of the female coupling element.
- The blocking member is a rigid ring surrounding the body and the piston.
- The female quick-connect coupling element comprises a groove, provided in an external surface of the body, in which the piston housing emerges, and suitable for guiding the blocking ring in the transverse direction of the female coupling element.
- Said transmission means are formed by the blocking ring.
- The female quick-connect coupling element comprises a pusher disposed between the elastic return element and the blocking ring.
- The pusher and/or the piston comprise a curvilinear external surface suitable for cooperating with an internal cylindrical surface of the blocking ring, whereas the radius of curvature of the curvilinear external surface of the pusher and/or of the piston is substantially equal to the radius of curvature of the internal cylindrical surface of the blocking ring.
- Said transmission means comprise a rod extending in the housing of the elastic return element as far as the piston through the fluid-flow conduit.

The blocking member is an external end of the piston suitable for cooperating, along the longitudinal axis of the female coupling element, with an axial surface of the control ring.

The blocking member is suitable for cooperating with an axial surface of the control ring when said ring is in its first position.

The body forms an external shoulder at the rear of the piston housing, whereas a ring external to the body radially covers the blocking member and the external shoulder in coupled and decoupled configurations of the coupling as well as during the manoeuvre of coupling and decoupling the coupling.

The female quick-connect coupling element comprises a valve closing off the conduit.

The invention also concerns a quick-connect coupling for joining two pressurised-fluid pipes, comprising a female element as described above and a complementary male coupling element.

BRIEF DESCRIPTION OF THE SEVERAL VIEWS OF THE DRAWINGS

The invention will be better understood and other advantages thereof will emerge more clearly in the light of the following description of a female quick-connect coupling element and quick-connect coupling according to the invention, given by way of non-limitative example and with reference to the accompanying drawings, in which:

FIG. 5 is a cross section along the plane V-V in FIG. 3, of the female element in FIG. 1;

FIG. 6 is a view similar to FIG. 5, in the configuration of FIG. 4;

DETAILED DESCRIPTION OF THE INVENTION

Figure 1:
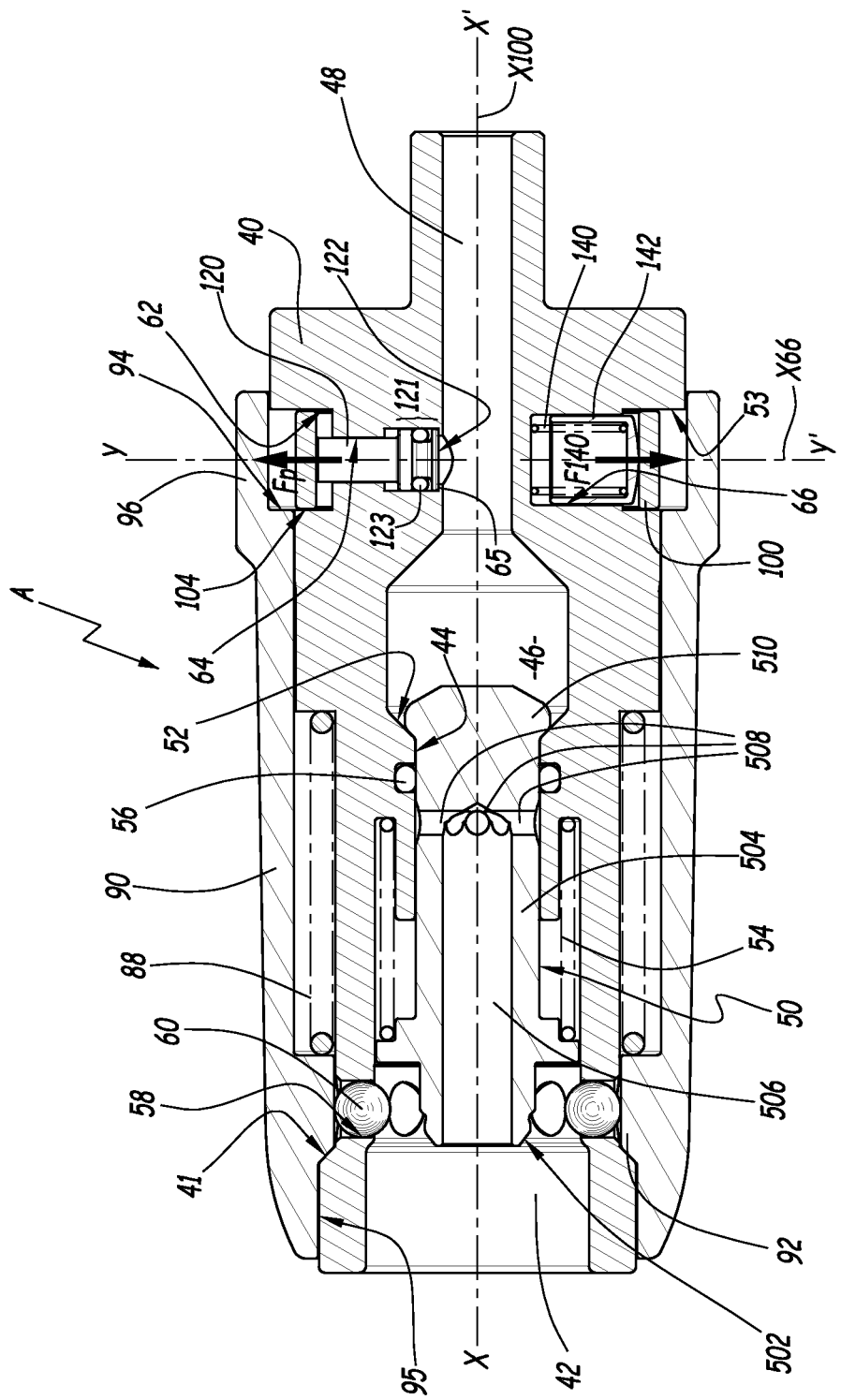
FIG. 1 is a longitudinal section of a female coupling element according to the invention in the uncoupled configuration.

The quick-connect coupling R depicted in FIGS. 2 to 8 comprises a first element formed as a female element A, depicted alone in FIG. 1, and a second element formed as a male element or connecting piece B, designed to fit in each other in the direction of an axis X-X' which in practice is a longitudinal axis of the element A, common to the elements A and B in the course of coupling or coupled.

By convention, it is considered that the front part of an element A or B is the part of this element turned towards the other element during connection thereof.

The rear part of the female element A is connected fluidically to a pipe, not shown, which may be connected to a pressurised-fluid source, not shown, in particular a source of gas such as LPG or hydrogen, for example at a pressure of around 800 bar. A control valve, not shown, connected between the female element A and the fluid source to which the female element A is connected, is suitable for controlling the flow of fluid to the female element A. The rear part of the male element B is connected to a second pipe, not shown, which may be connected to a component using or storing fluid coming from the aforementioned source. A valve, not shown, is suitable for opening and closing the passage between the male element B and the use or storage component. By way of example, the pipe connected to the rear part of the male element B may be connected to a tank loaded on a motor vehicle.

The male element B comprises a tubular body 11 that defines a channel 12 for flow of pressurised fluid. On its external peripheral surface 13, the body 11 is provided with a peripheral groove 15 of revolution with a flat bottom and frustoconical edges.

The tubular body 11 is also provided, on an internal radial surface 17, and in the vicinity of a front face 18, with a peripheral groove 19 of revolution, in which an elastomer O-ring seal 20 is received.

The female element A comprises a main tubular body 40, defining an insertion channel 42 on the front side of the female element A, and in which the male element B is suitable for being inserted. The insertion channel 42 is extended by a bore 44 towards the rear of the female element A, and then by an intermediate chamber 46, and finally by a rear channel 48 situated at the rear of the female element A.

The female element A comprises a valve 50 a front part of which comprises a frustoconical front edge 502 suitable for coming into contact with the O-ring seal 20 when the male element B is inserted in the female element A. The valve 50 also comprises a central sleeve 504 that is mounted in the bore 44 so as to slide along the axis X-X'. The valve 50 comprises a channel 506 that opens towards the front in the vicinity of the frustoconical edge 502 and towards the rear through holes 508 directed perpendicular to the axis X-X'. The valve 50 also comprises a rear circular stop 510 suitable for coming into contact against a seat 52 of the body 40, situated in the intermediate chamber 46.

The chamber 46 and the rear channel 48 form together a conduit 400 for flow of fluid in the body 40.

In the uncoupled configuration of the coupling R, depicted in FIG. 1, and in which the male element B is not inserted in the female element A, the valve 50 is pushed by a spring 54 into a closed position, in which the stop 510 is in abutment against the seat 52. In this position, the holes 508 in the valve 50 emerge in the bore 44. An O-ring seal 56 placed in the bore 44 and cooperating with the valve 50 at the rear of the holes 508 prevents the flow of fluid from the intermediate chamber 46 to the outside of the female element A.

The front part of the body 40 comprises housings 58 formed by cylindrical holes with a circular cross section oriented perpendicular to the axis X-X'. Locking balls 60 are mounted in the housings 58. In the coupled configuration of the coupling depicted in FIG. 3, the balls 60 project into the insertion channel 42 so as to engage in the groove 15 of the male element B and to lock the latter in the coupled configuration in the female element A. In this configuration, the locking balls 60 are held in the insertion channel 42 under the action of a protruding part 92 of a cylindrically shaped locking ring 90 with a circular cross section mounted on the outside of the body 40 with the possibility of sliding along the axis X-X'. The protruding part 92 projects radially in the direction of the axis X-X' so as to push the balls 60 in the direction of the axis X-X'. In the configuration in FIG. 3, the locking ring 90 is in the front locking position or first position, and the balls 60 project into the insertion channel 42 and keep the male element B fitted in the female element A. In its front position, the locking ring 90 locks each of the locking balls 60 in a locking position of the male element B in the female element A in the coupled position.

To uncouple the male element B from the female element A, the locking ring 90 must be pulled towards the rear by an operator. In its rear or second position, which corresponds to its so-called release position, the locking ring 90 does not oppose an external radial movement of each of the locking balls 60 to a release position in which the balls 60 no longer project into the insertion channel 42 and the male B and female A elements can be uncoupled. The uncoupling manoeuvre must be performed when the pressure of the fluid flowing in the fluid-flow channel is less than a predefined safety pressure, for example 10 bar. This ensures that that the uncoupling of the coupling will not produce any whiplash effect when the operator disconnects the male element B from the female element A.

To prevent the manoeuvring of the locking ring 90, the female element A comprises a member for blocking the locking ring 90 in its forward position. The position of the blocking member is controlled by the fluid pressure in the fluid-flow conduit 400, so that the blocking member prevents the rearward translation of the locking ring 90 when the pressure of the fluid in the conduit 400 is greater than the safety pressure.

In the embodiment depicted in FIGS. 1 to 6, the blocking member is a closed blocking ring 100 mounted around the body 40. The blocking ring 100 is rigid, that is to say it does not deform under the conditions of use, in particular mechanical and temperature, of the coupling R. The blocking ring 100 is sufficiently rigid not to deform under the effect of an axial force exerted by the locking ring 90 actuated normally by an operator. The blocking ring 100 is centred around a longitudinal axis X100 that is merged with the axis X-X' in the configuration in FIGS. 1 to 3 and 5. The blocking ring 100 is housed in a peripheral guide groove 62 of the body 40, which is provided in an external surface 402 of the body 40. The groove 62 guides the blocking ring 100 in a transverse direction Y-Y' of the female element A, perpendicular to the axis X-X'. The outside diameter of the ring 100 is less than or equal to the diameter of the external surface 402 around which the locking ring 90 slides between its front position and its rear position.

The position of the blocking ring 100 is controlled according to the pressure of the fluid in the conduit 400 by means of a piston 120 mounted so as to be able to move sealingly in a bore 64 in the body 40, which forms the housing of the piston 120. The housing 64 is centred around the direction Y-Y' perpendicular to the axis X-X' and passes through the body 40 from the rear channel 48 towards the outside of the body 40 of the female element A. The housing 64 emerges in the groove 62. The piston 120 comprises an end collar 121 with a diameter equivalent to the diameter of the bore 64. The collar 121 forms an active surface 122 situated on the same side as the rear channel 48 and on which the pressure of the fluid present in the rear channel 48 is exerted, in the form of a force Fp. In other words, the active surface 122 is continuously in fluid contact with the rear channel 48. A gasket 123 disposed in a groove in the collar 121 and cooperating with the bore 64 provides the seal between the rear channel 48 and the outside of the coupling element A at the bore 64. The piston 120 extends in the direction of the external surface 402 from the active surface 122 opposite to the conduit 400.

The piston 120 is also mechanically connected to the blocking ring 100, to which it transmits the force Fp. To this end, the piston 120 comprises a curvilinear external surface end 124 that transmits the force Fp to the blocking ring 100, cooperating with an internal cylindrical surface 102 of the blocking ring 100. Curvilinear surface means a surface that can be in a section of a cylinder or sphere and having a generatrix in an arc of a circle definable by its radius of curvature. The radius of curvature of the curvilinear surface 124 is substantially equal to the radius of curvature of the surface 102. The female element A comprises at least one return element suitable for pushing the blocking ring 100 and the piston 120 to a release position, depicted in FIGS. 1 to 3 and 5, in which the blocking ring 100 does not pass radially beyond the external surface 402 and therefore does not block the rearward movement of the locking ring 90. The return element is a spiral spring 140 in abutment in a housing 66 of the body 40. The longitudinal axis of the spiral compression spring 140 and the longitudinal axis X66 of the bore forming the housing 66 are parallel to each other, preferably coaxial and merged with the direction Y-Y'. The housing 66 is situated outside the housing 64 of the piston 120, in other words the housing 66 does not emerge on the housing 64 and does not communicate fluidically with the housing 64. More precisely the housing 66 is provided in the body 40 opposite, along the axis X-X', the housing 64 with respect to the rear channel 48. This construction makes available a longer housing for the spring 140, which makes it possible, for a travel of the piston 120 equivalent to that of a coupling of the prior art, to obtain a ratio between the travel of the piston 120 and the length of the housing 66 of the spiral spring 140 less than that of the coupling of the prior art. This affords better control of the return forces of the blocking ring 100 without being detrimental to the radial size of the coupling, compared with known equipment. The housing 66 emerges on the outside of the body 40 but does not emerge in the rear channel 48.

The female element A comprises a pusher 142, in which the spiral spring 140 is housed and is mounted so as to be able to move in the housing 66. The pusher 142 transmits, between the spring 140 and the blocking ring 100, a return force F140 exerted by the spring 140. The pusher 142 is in contact with the internal cylindrical surface 102 of the blocking ring 100 in order to transmit the force F140. A curvilinear external surface 144 of the pusher 142 is in contact with the cylindrical internal surface 102 of the blocking ring 100. The radius of curvature of the curvilinear surface 144 is substantially equal to the radius of curvature of the internal cylindrical surface 102.

Being in contact simultaneously with the curvilinear external surface 124 of the piston and with the curvilinear external surface 144 of the pusher 142, the blocking ring 100 is therefore integral in its transverse movement in the direction Y-Y' with the movement of the piston 120.

The blocking ring 100 forms a means for transmitting the return force F140 between the spring 140 and the piston 120. The blocking ring 100 elastically pushes the piston 120 counter to the pressure force Fp. The blocking ring 100 being mounted around the body 40, it avoids the use of a means for transmitting force between the piston 120 and the spring 140 that passes through the rear channel 48. The blocking ring 100 therefore avoids disturbances in the flow of the fluid and reduces the number of gaskets necessary for isolating the spring 140 from the flow conduit 400.

The blocking ring 100 has a rectangular toric cross section and comprises an axial lateral surface 104 suitable for receiving in abutment a rear axial surface 94 of the locking ring 90. The use of a blocking member of the ring type makes it possible to limit the radial size of the female element A.

The locking ring 90 is pushed by a spring 88 in the direction of its forward position, in abutment against an external front shoulder 41 of the body 40.

The functioning of the quick-connection coupling R is as follows: in the uncoupled configuration of the coupling R shown in FIG. 1, the blocking ring 100 is in a release position, in which the lateral surface 104 does not block the rearward movement of the locking ring 90. This is because, in this case, the pressure of the fluid in the conduit 400 closed off by the valve 50 is less than the safety pressure. The piston 120 is therefore pushed in its housing 64 by the force F140 exerted on the blocking ring 100 so that the lateral surface 104 is not, in a direction parallel to the axis X-X', facing the axial surface 94. In this internal position, the active surface 122 of the piston 120 is in abutment against a shoulder 65 of the housing 64, which limits the travel of the piston 120 towards the rear channel 48.

Figure 2:
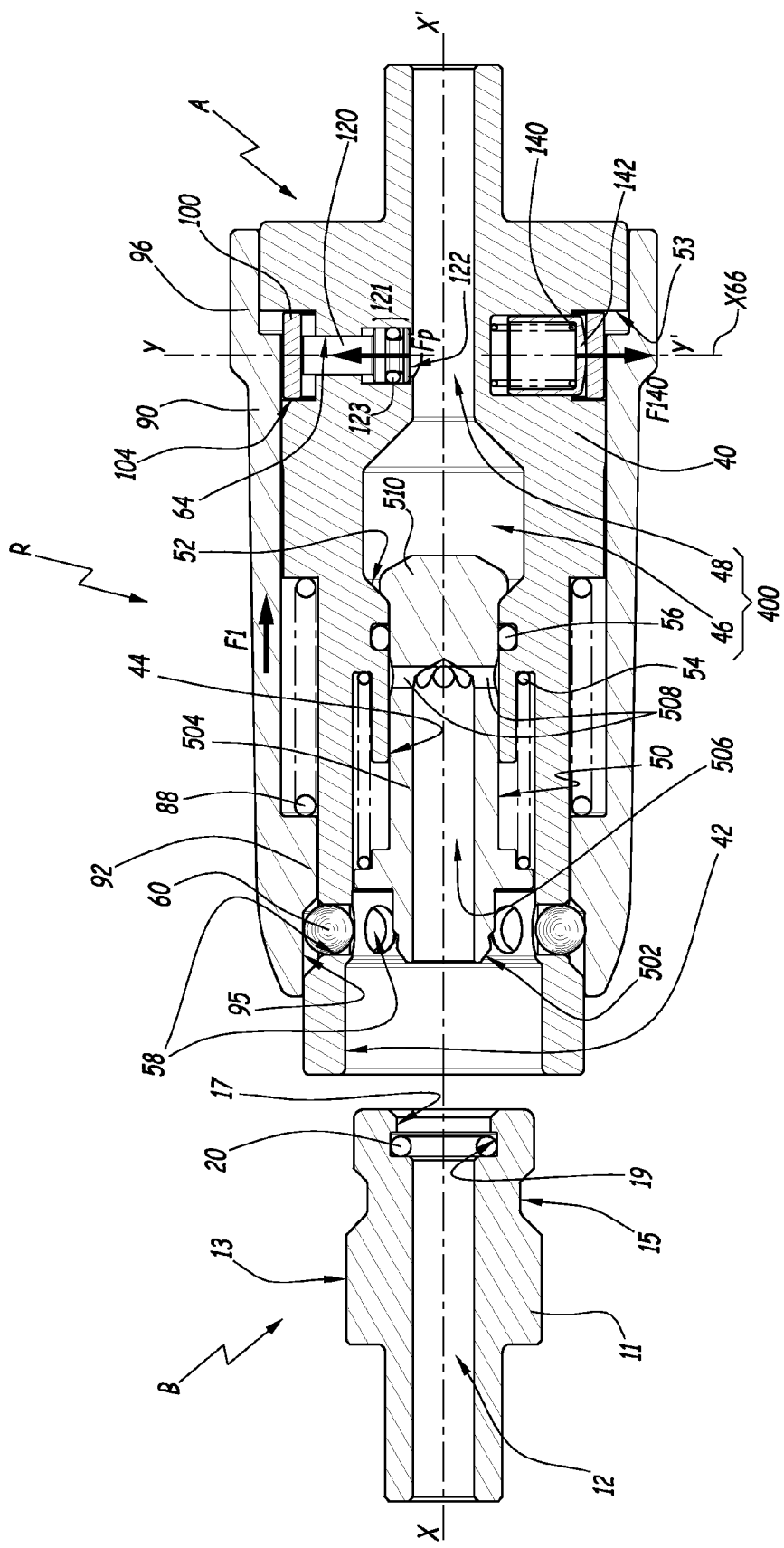
FIG. 2 is a view similar to FIG. 1 of a quick-coupling according to the invention including the female coupling element of FIG. 1 and a male coupling element, in the course of coupling.
Figure 3:
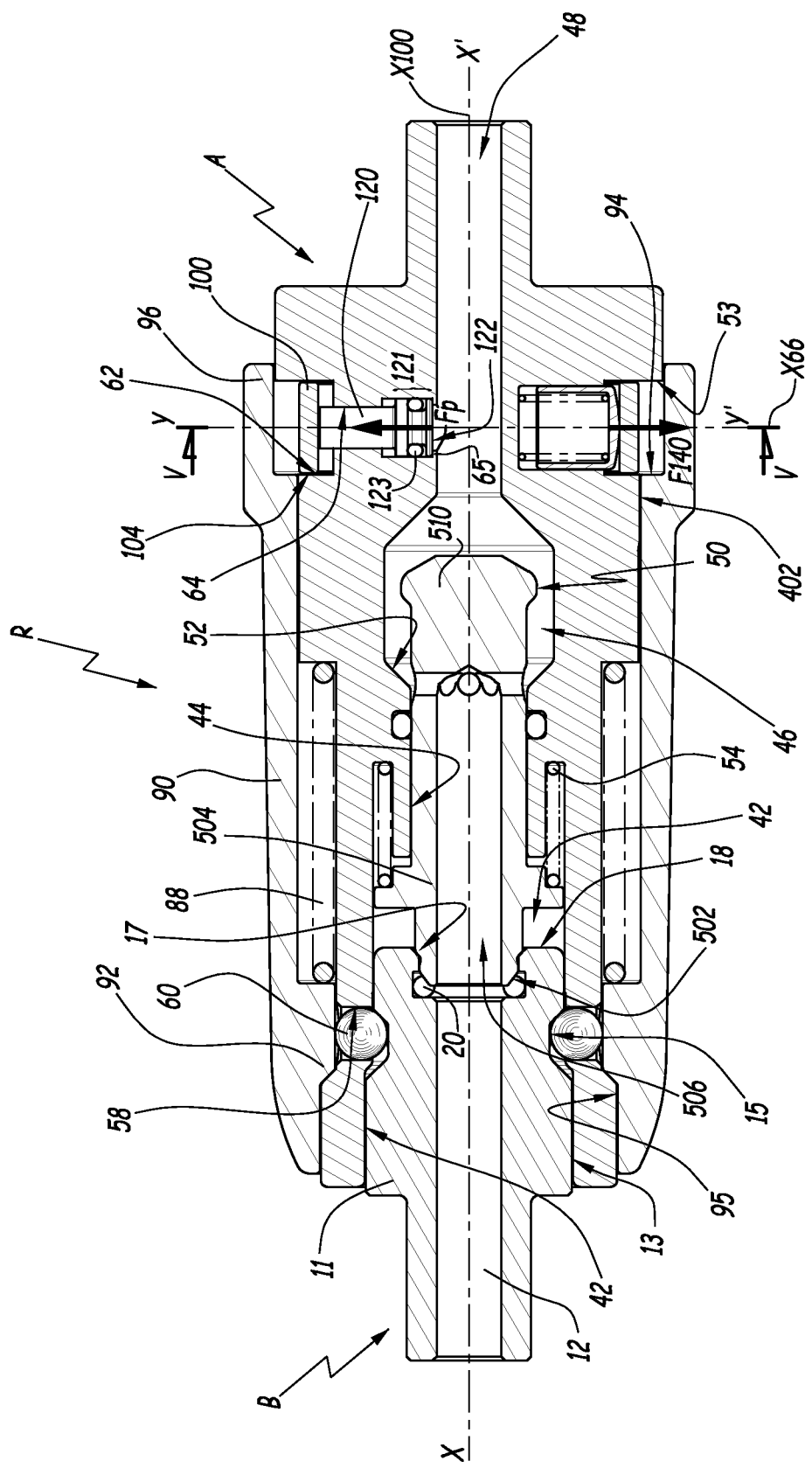
FIG. 3 is a view similar to FIG. 2, the male coupling element being coupled and locked in the female element.

When the male element B is engaged in the female element A, the locking ring 90 is moved towards the rear in the direction of the arrow F1 by the operator so that the locking balls 60 are radially pushed by the tubular body 11 of the male element B in the release position towards a front part 95 of the locking ring 90, the inside diameter of which is greater than that of the protruding part 92. This configuration of the locking ring 90 is shown in FIG. 2. When the male element B moves forward in the female element A, after sealing at the gasket 20, the valve 50 is pushed towards to the rear counter to the action of the spring 54. When the male element B is sufficiently inserted in the female element A, the locking balls 60 are situated radially at the peripheral groove 15 and engage therein, under the action of the locking ring 90, which is pushed towards its forward position by the spring 88, at the moment when the operator releases his action on the locking ring 90. When the locking ring 90 arrives in its forward position, the balls 60 are pushed in the direction of the axis X-X' by the protruding part 92 and held in the groove 15 in the locking position, which locks the male element B in the body 40 of the female element A along the longitudinal axis X-X', preventing its withdrawal out of the female element A.

Once the coupling is coupled, the supply of fluid to the female element A is activated by means of the control valve. The pressurised fluid, at around 800 bar, coming from the pipe connected to the female element A, arrives in the fluid-flow conduit 400 and flows through holes 508 that communicate with the rear channel 48, through the channel 506 and through the channel 12. The pressure in the rear channel 48 increases beyond the safety pressure and is exerted on the active surface 122. The active surface 122 is therefore pushed in the direction Y-Y' outwards in the housing 64 and the piston 120 is then moved from its internal position in FIGS. 1 to 3 and 5 in the direction of the arrow F2 towards its external position in FIGS. 4 and 6, in which it is no longer in contact with the shoulder 65, counter to the force F140 exerted on blocking ring 100. As the external cylindrical surface 124 is kept in contact with the internal surface 102, by the spring 140 and the pusher 142, the blocking ring 100 is also moved in the direction Y-Y' along the arrow F2, as far as a blocking position where the ring 100 projects radially beyond the external radial surface 402 and in which the lateral surface 104 partially faces, in a direction D100 parallel to the axis X-X', the rear axial surface 94. In this external position, the piston 120 is held by the force Fp in abutment against a shoulder 64a of the housing 64.

Figure 4:
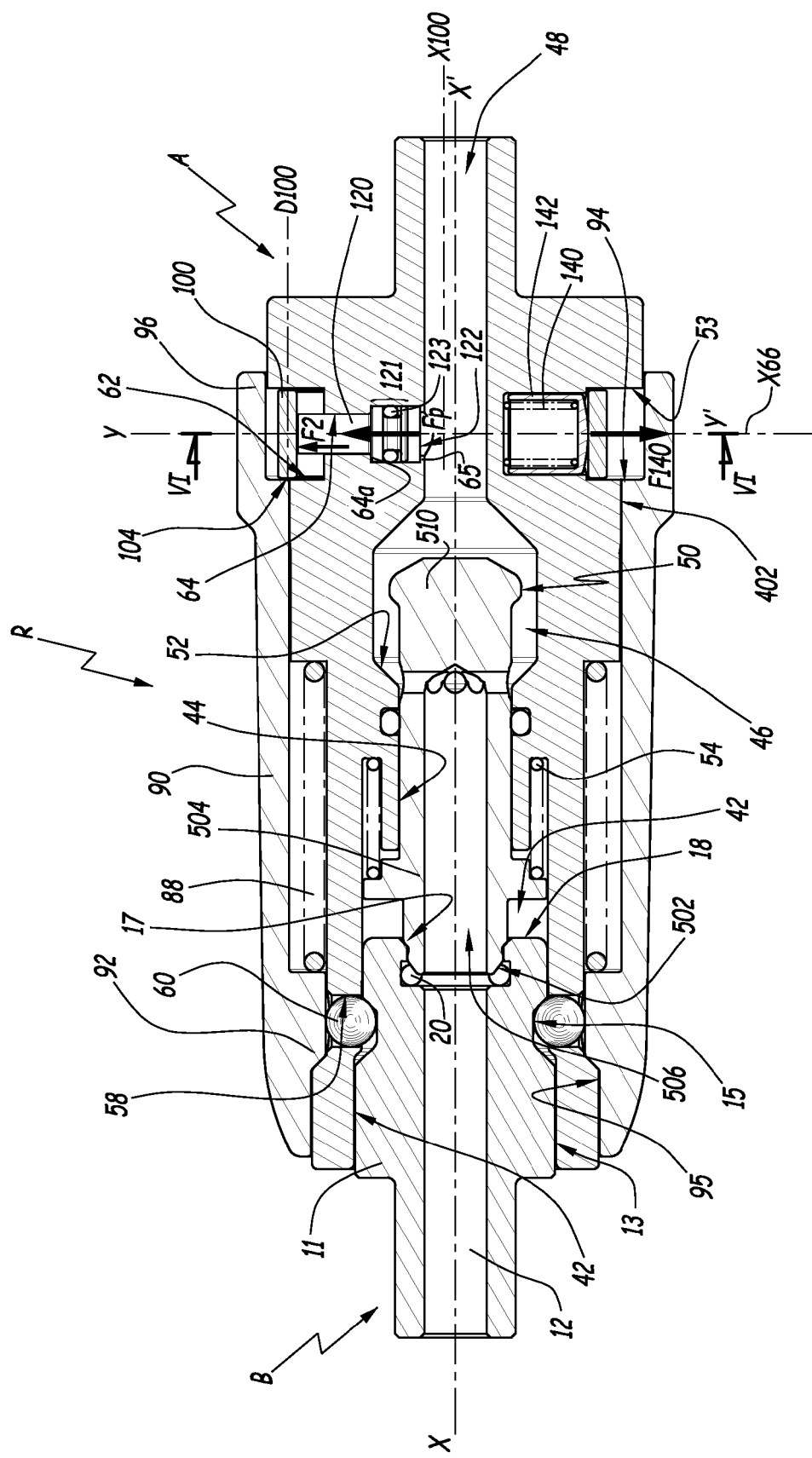
FIG. 4 is a view similar to FIGS. 2 to 3, in a blocked configuration of a locking ring of the female element coupled to the male element.

In the configuration in FIGS. 4 and 6, the locking ring 90 cannot be moved towards the rear in order to release the locking balls 60 and disconnect the male element B from the female element A, since the lateral surface 104 of the blocking ring 100 forms an obstacle to the movement of the locking ring 90 along the axis X-X' as far as its release position cooperating with the rear axial surface 94. The abutment between the lateral surface 104 and the rear axial surface 94 is made on a contact surface in the form of a crescent, which prevents the risk of marking of the parts, as is the case with couplings in which the locking ring is blocked in translation by the piston along a contact line.

When the transfer of fluid in the coupling R has ended, for example if a hydrogen tank of a vehicle is completely filled, the supply of fluid is stopped by manoeuvring the control valve and the passage between the male element B and the tank is closed. The fluid contained in the conduit 400 and in the conduit 12 is drained. The flow rate and the pressure of the fluid in the rear channel 48 decreases and the force Fp exerted by the pressure of the fluid decreases. When the pressure in the rear channel 48 is once again less than the safety pressure, the piston 120 is returned to its internal position, in abutment against the shoulder 65, under the action of the return force F140 via the blocking ring 100. The blocking ring 100 returns to its release position, and the operator manipulating the coupling can once again move the locking ring 90 to its rear position in order to uncouple the coupling R without danger. With the locking ring 90 in the rear position, the locking balls 60 are pushed into the release position by the external surface of the male element B removed out of the body 40 of the female element A.

The piston 120 is therefore continuously subjected to the pressure differential on either side of the gasket 123, that is to say to the pressure of the fluid in the channel 48 and to the atmospheric pressure of the air outside the coupling and to the elastic return force F140. The return force F140 is sized according to the safety pressure, so that, for a pressure in the rear channel 48 less than the safety pressure, the piston 120 is automatically returned and held in its internal position, under the elastic force F140, and so that a pressure in the internal channel 48 that is greater than the safety pressure places the piston 120 in the external position, counter to the elastic force F140. The force Fp exerted by the fluid in the channel 48 on the active surface 122 then becomes greater than the force F140, the pressure forces of the external air on the piston 120 and the adhesion and the friction forces of the piston 120 in its housing 64.

In the case where, in the uncoupled configuration, the pressure of the fluid existing in the rear channel 48 closed off by the valve 50 is greater than the safety pressure, the connection of the coupling R must be prevented for safety reasons. The piston 120, moved into the external position under the action of the force Fp, pushes and holds the blocking ring 100 in its blocking position. The rearward translation of the locking ring 90 is therefore impossible. The locking balls 60 cannot therefore be pushed in the opposite direction to the axis X-X' when the male element B is inserted in the female element A. The coupling R cannot therefore be connected.

The locking ring 90 comprises a rear tubular wall 96 extending towards the rear of the female element A beyond the axial surface 94. The rear tubular wall 96 covers the groove 62 and a rear external shoulder 53 of the body 40 in each of the configurations of the female element A during the functioning of the coupling R. The rear tubular wall 96 therefore procures protection of the blocking ring 100 and the piston 120 vis-à-vis external contaminations that could in particular interfere with the sliding of the piston 120. The locking ring 90 forms a control ring since its movement controls the release of the locking balls 60 for the coupling and uncoupling of the coupling.

According to an embodiment of the invention that is not shown, the female coupling element A may not comprise a pusher 142. In this case, the spring 140 acts directly on the blocking ring 100, which may comprise for this purpose a flat perpendicular to the longitudinal axis of the spring 140.

In the following embodiments, the elements common to the first embodiment bear the same references and function in the same way. Only the differences with respect to the first embodiment are described below.

Figure 7:
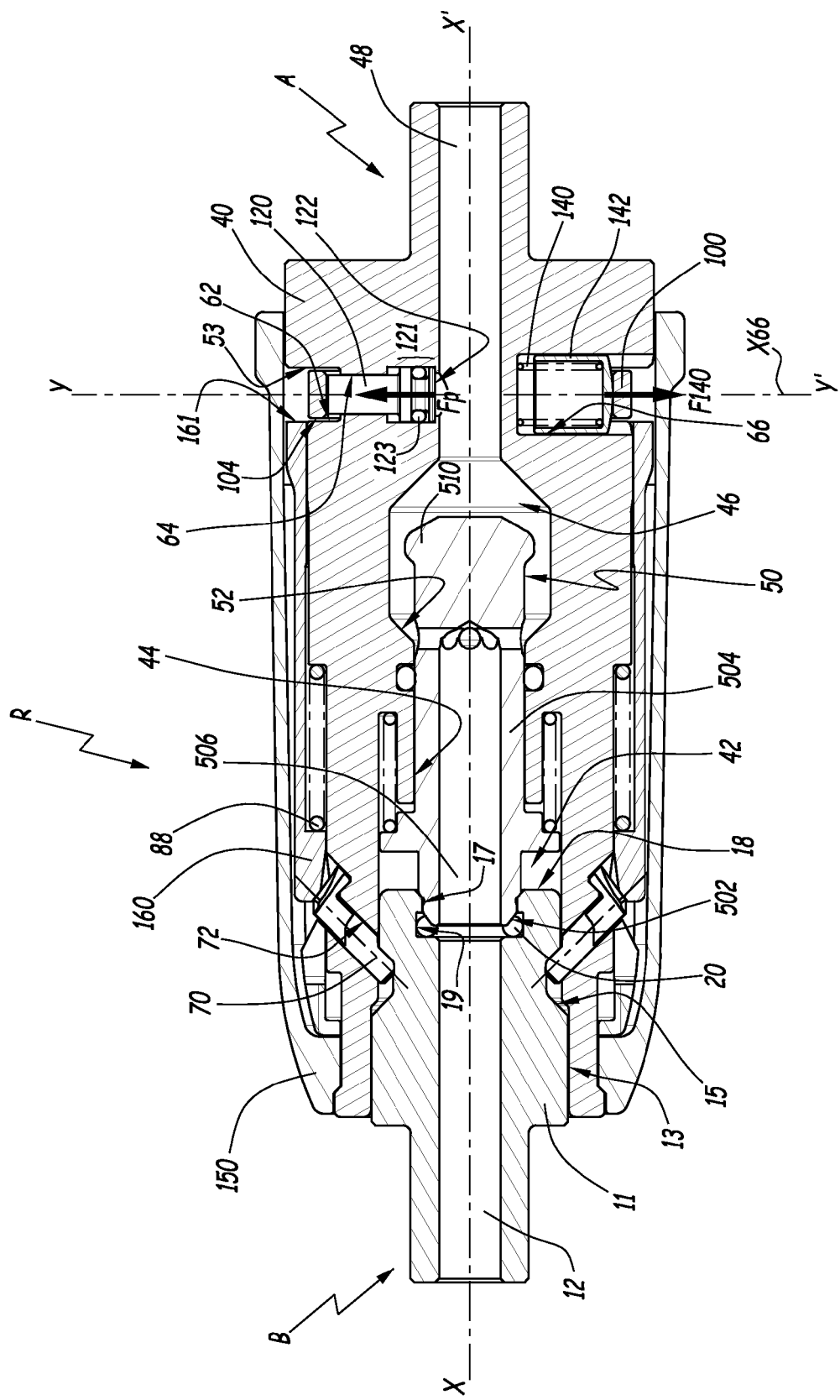
FIG. 7 is a view similar to FIGS. 2 to 4, of a coupling comprising a female element according to a second embodiment of the invention depicted in the coupled configuration.

A second embodiment of the invention is shown in FIG. 7. This embodiment differs from the embodiment in FIGS. 1 to 6 through the fact that the members locking the male element B in the female element A are not balls 60 but fingers 70 housed in cylindrical housings 72 in the body 40 inclined with respect to the axis X-X' and inclined with respect to a direction radial to the axis X-X'. One end of the fingers 70 situated on the same side as the axis X-X' is suitable for engaging in the groove 15 in a male element B in the coupled configuration of the coupling R. The female element A comprises an external ring 150 that surrounds an internal ring 160 in which the fingers 70 are partially housed and which also covers the groove 62 and the external rear shoulder 53 in order to protect the locking ring 100 and the piston 120 against external contaminations in all the positions of the external ring 150 during functioning. The functioning of the fingers 70 and elements that interact with the internal ring 160 and the fingers 70 are described in the patent EP-B-1 862 720. In particular, in order to uncouple the coupling, the external ring 150 is moved towards the rear from a first position, illustrated in FIG. 7, in which the fingers 70 are held between the male element B and the cylindrical housings 72 in the locking position with the internal ring 160 in the forward position, as far as a second position, not shown, in which the external ring 150 has driven the internal ring 160 into the rear position, and therefore the fingers 70 into the release position. In the same way as in the first embodiment, the internal ring 160 is blocked with respect to rearward translation in its forward position by the blocking ring 100, which is opposed to a rear axial surface 161 of the internal ring 160, which prevents the connection and disconnection when the pressure of the fluid in the rear channel 48 is greater than the safety pressure. The internal ring 160 fulfils the role of control ring insofar as the movement of the internal ring 160 towards the rear controls the coupling and uncoupling of the coupling.

In a variant that is not shown, the external ring 150 may be blocked in translation in its first forward position by the blocking ring 100 in place of the internal ring 160, which prevents disconnection at a pressure greater than the safety pressure. The external ring 150 fulfils the role of control ring insofar as the movement of the external ring 150 towards the rear controls the uncoupling of the coupling.

The aim of the invention is therefore to block the movement of a control ring of the coupling element when this movement allows the uncoupling of the coupling even if this control ring does not directly cooperate with the locking members in the locking position and/or in the release position. In a variant that is not shown, the blocking member forms an obstacle to the movement of the control ring, over its uncoupling travel, between its first position and its second position, so that the locking members cannot reach their release position. In this case, a certain amount of travel towards its second position is enabled for the control ring, this travel being insufficient to release the locking members and allow uncoupling of the coupling.

According to embodiments that are not shown, the members locking the male element B in the female element A may also be locking claws, or spherical fingers in accordance with EP-B-2 278 205.

Figure 8:
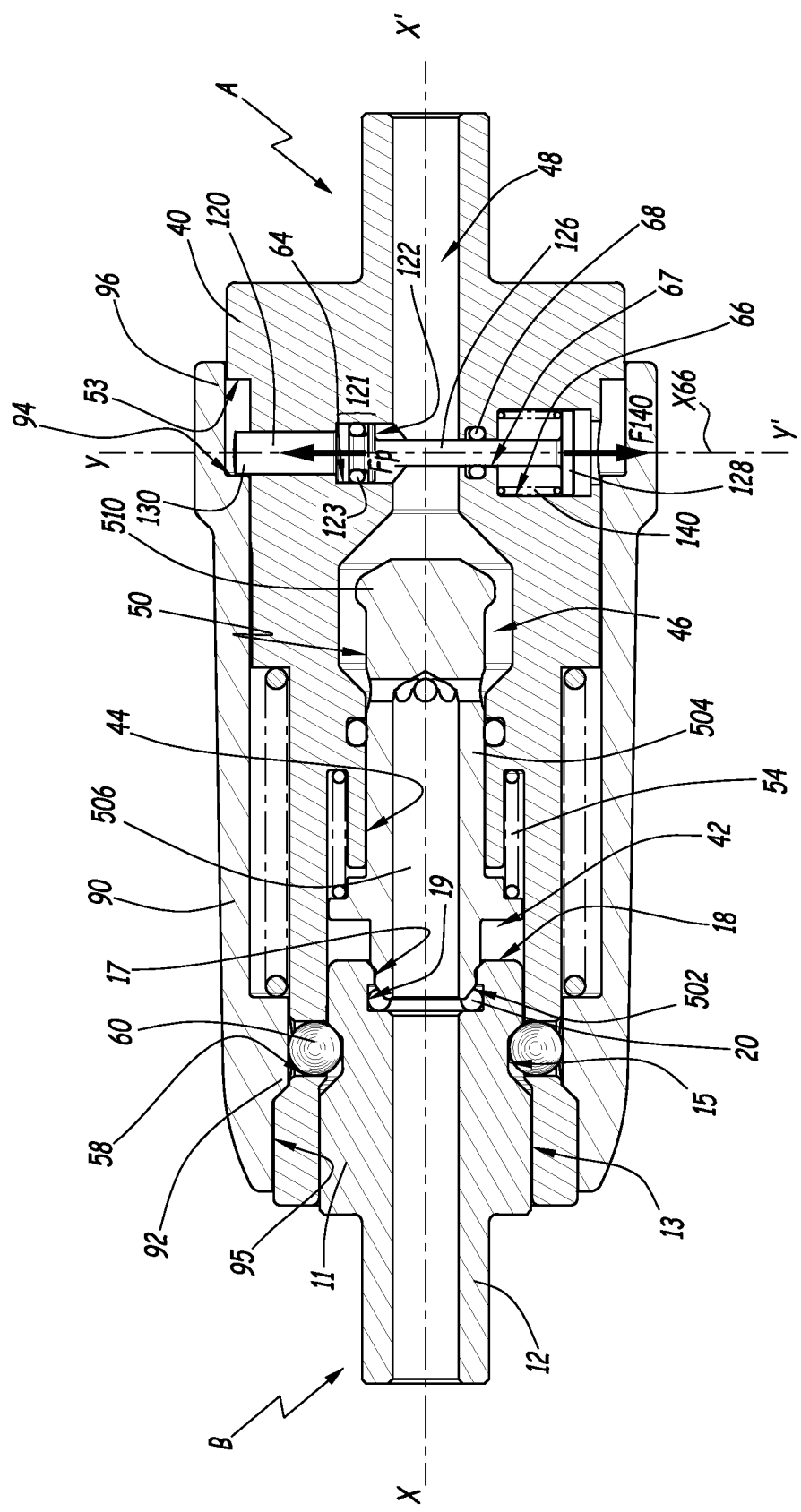
FIG. 8 is a view similar to FIGS. 2 to 4, of a coupling comprising a female element according to a third embodiment of the invention depicted in the coupled configuration.

A third embodiment of the invention is shown in FIG. 8. This embodiment differs from the embodiment in FIGS. 1 to 6 through the fact that the female element A does not in this case comprise a blocking ring 100. The active surface 122 of the piston 120, on which the action of the pressurised fluid in the rear channel 48 is exerted, is annular in shape and able to move in the housing 64. A transmission rod 126 passes through the rear channel 48 in the direction Y-Y' and terminates in the housing 66 in an end washer 128. The rod 126 extends as far as the centre of the active surface 122. The end washer 128 has a diameter equivalent to the diameter of the housing 66. The spring 140, in abutment in the housing 66, bears on the end washer 128 in order to exert the return force F140. The housing 66 is here connected to the rear channel 48 by a cylindrical mouth 67, and the sealing of the housing 66 with respect to the rear channel 48 is achieved by an O-ring seal 68 disposed between the mouth 67 and the rod 126.

In this embodiment, the blocking member is formed by the piston 120, an external end 130 of which, which projects radially outside the body 40, when the piston 120 is moved and held in the external position by the fluid pressure in the flow conduit of the female element A, opposes the rearward translation of the locking ring 90. In this case, the contact between the piston 120 and the ring 90 is achieved along a contact line. In a variant, the piston 120 may have a lateral surface for surface contact with the ring 90.

The rod 126 and the end washer 128, in a single piece with the piston 120, form means for transmitting the return force F140 to the piston 120.

As the piece comprising the piston 120, the transmission rod 126 and the transmission washer 128 has a length greater than that of the piston 120 only in the direction Y-Y', the flexion force generated by any forces of the locking ring 90 towards the rear on the piston 120 in the external position is reduced. The linear guidance of the piston 120 is improved, which reduces the risks of leakage between the piston 120 and the body 40 at the gasket 123.

According to an embodiment that is not shown, the piston passing through the rear channel 48 described in FIG. 8 can be associated with a blocking ring similar to the blocking ring 100, mounted outside the body 40 and suitable for blocking the locking ring 90. In this case, the blocking ring does not provide the transmission of the return force F140 between the spring 140 and the piston 120 since the spring 140 bears on the washer 128, but is able to provide blocking of the surface type of the locking ring in order to prevent its uncoupling manoeuvre. The movement of the blocking ring 100 is integral with the movement of the piston 120 in the direction Y-Y' to within radial clearances.

According to another embodiment of the invention that is not shown, the female element A may comprise several return springs each disposed in a housing in the body isolated sealingly from the flow conduit 400. The housings of these springs are preferably parallel to the housing of the piston 120 so as to guarantee return forces parallel to the pressure force Fp exerted on the piston 120. In this case, the means transmitting the return force between the springs and the piston 120 may comprise a U-shaped piece, disposed around the body 40 and sufficiently rigid to transmit the return force F140 to the piston 120, and the blocking member may be formed by an external end of the piston 120. The female element A may in particular comprise two springs each exerting a force on one of the arms of the U, while the return force is transmitted to the piston in contact with the rounded middle part of the U.

In a variant that is not shown, several pistons like the piston 120 may act on a single blocking member of the ring type.

In all the embodiments, the return spring 140 of the piston 120 in the internal position is disposed entirely in a housing 66 that is fluidically isolated from the fluid-flow conduit 400, which guarantees that the behaviour of the spring 140 is not interfered with by the flow and by the pressure of the fluid in the coupling element, and therefore makes detection of a safety pressure reliable.

According to an embodiment of the invention that is not shown, the movement of the control ring that causes the release of the coupling may be effected from rear to front, instead of taking place from front to rear. In this case, the first position of the control ring is a rear position, whereas the second position is a front position.

The features of the embodiments and variants described above may be combined in the context of the present invention.

The invention claimed is:

1. A female quick-connect coupling element, for joining two pressurized fluid pipes, the female quick-connect coupling element being able to cooperate, along a longitudinal fitting axis of the female quick-connect coupling element, with a complementary male coupling element, the female quick-connect coupling element comprising:
   a body through which a fluid-flow conduit passes,
   at least one locking member movable between a position of locking the complementary male coupling element with respect to the body of the female quick-connect coupling element in a coupled configuration of a coupling formed by the female quick-connect coupling element and the complementary male coupling element, and a release position, in which the female quick-connect coupling element and the complementary male coupling element of the coupling can be uncoupled,
   a control ring movable in translation along the longitudinal fitting axis between a first position in which the at least one locking member is held in its locking position, and a second position in which the at least one locking member moves into its release position,
   a piston including an active surface in fluid contact with the fluid-flow conduit and being movable sealingly in a piston housing passing through the body in a transverse direction from the fluid-flow conduit towards an outside of the body, wherein an elastic return element housing is provided in the body opposite to the piston housing with respect to the longitudinal fitting axis of the female quick-connect coupling element and the piston extending from the active surface opposite to the fluid-flow conduit,
   a blocking member, the blocking member being movable in a direction parallel to the transverse direction and the transverse movement of the blocking member being integral with the movement of the piston,
   the piston being movable from an internal position in which the blocking member does not block the movement of the control ring, to an external position in which the blocking member prevents the translation of the control ring to its second position, and
   at least one elastic return element for the elastic return of the piston to its internal position,
   wherein
   the at least one elastic return element is mounted in the elastic return element housing situated outside the piston housing, the elastic return element housing being fluidically isolated from the fluid-flow conduit, and
   the female quick-connect coupling element including a transmission means, disposed between the at least one elastic return element and the piston, for returning the piston to its internal position.

2. The female quick-connect coupling element according to claim 1, wherein the blocking member includes a lateral surface adapted for receiving, in surface abutment, along the longitudinal fitting axis of the female quick-connect coupling element, an axial surface of the control ring.

3. The female quick-connect coupling element according to claim 1, wherein the transmission means are mounted outside the body of the female quick-connect coupling element.

4. The female quick-connect coupling element according to claim 1, wherein the transmission means includes a rod extending from within the elastic return element housing to as far as the piston through the fluid-flow conduit.

5. The female quick-connect coupling element according to claim 1, wherein the blocking member is an external end of the piston capable of cooperating, along the longitudinal fitting axis of the female quick-connect coupling element, with an axial surface of the control ring.

6. The female quick-connect coupling element according to claim 1, wherein the blocking member is capable of cooperating with an axial surface of the control ring when the control ring is in its first position.

7. The female quick-connect coupling element according to claim 1, wherein the body forms an external shoulder at a rear of the piston housing, and wherein a ring external to the body radially covers the blocking member and the external shoulder in coupled and decoupled configurations of the coupling as well as during a maneuver of coupling and decoupling the coupling.

8. The female quick-connect coupling element according to claim 1, further comprising a valve closing off the conduit.

9. A quick-connect coupling for joining two pressurized fluid pipes, comprising a female quick-connect coupling element according to claim 1 and a complementary male coupling element.

10. The female quick-connect coupling element according to claim 1, wherein the blocking member is a rigid blocking ring surrounding the body and the piston.

11. The female quick-connect coupling element according to claim 10, further comprising a groove, provided in an external surface of the body, in which the piston housing emerges, and adapted for guiding the rigid blocking ring in the transverse direction of the female quick-connect coupling element.

12. The female quick-connect coupling element according to claim 10, wherein the transmission means are formed by the rigid blocking ring.

13. The female quick-connect coupling element according to claim 12, further comprising a pusher disposed between the at least one elastic return element and the rigid blocking ring.

14. The female quick-connect coupling element according to claim 13, wherein the pusher and/or the piston include a curvilinear external surface for cooperating with an internal cylindrical surface of the rigid blocking ring, and wherein a radius of curvature of the curvilinear external surface of the pusher and/or of the piston is substantially equal to a radius of curvature of the internal cylindrical surface of the rigid blocking ring.

\* \* \* \* \*